United States Patent [19]

Gray et al.

[11] Patent Number: 5,570,667
[45] Date of Patent: Nov. 5, 1996

[54] INTERNAL COMBUSTION ENGINE LOW TEMPERATURE STARTING SYSTEM

[75] Inventors: Clint D. Gray; Norman J. Hole; Gary D. Webster, all of Nepean, Canada

[73] Assignee: Advanced Engine Technology Ltd., Nepean, Canada

[21] Appl. No.: 410,686

[22] Filed: Mar. 27, 1995

[30] Foreign Application Priority Data

Mar. 25, 1994 [GB] United Kingdom .................. 9405984

[51] Int. Cl.$^6$ .................................................. F02M 31/00
[52] U.S. Cl. ...................................................... 123/179.21
[58] Field of Search ........................... 123/179.21, 179.7, 123/550, 551, 556, 543, 547

[56] References Cited

U.S. PATENT DOCUMENTS

| | | | |
|---|---|---|---|
| 3,561,413 | 2/1971 | Zurner | 123/179.21 |
| 3,731,666 | 5/1973 | Langen | 123/179.21 |
| 3,949,723 | 4/1976 | Beesch | 123/179.21 |
| 3,978,836 | 9/1976 | Noguchi et al. | 123/179.21 |
| 4,027,642 | 6/1977 | Kamada et al. | 123/179.21 |
| 4,030,464 | 6/1977 | Yamaguchi et al. | 123/179.21 |
| 4,120,273 | 10/1978 | Krause et al. | 123/179.21 |
| 4,413,606 | 11/1983 | Klak et al. | 123/550 |
| 4,548,186 | 10/1985 | Yamaji et al. . | |
| 4,770,136 | 9/1988 | Newman | 123/179.21 |
| 5,119,775 | 6/1992 | Kokubo et al. | 123/179.21 |

FOREIGN PATENT DOCUMENTS

| | | |
|---|---|---|
| 0107689 | 7/1917 | United Kingdom . |
| 0133082 | 10/1919 | United Kingdom . |
| 0150975 | 3/1922 | United Kingdom . |
| 0187174 | 10/1922 | United Kingdom . |
| 0195939 | 2/1923 | United Kingdom . |

*Primary Examiner*—Marguerite McMahon
*Attorney, Agent, or Firm*—Marks & Clerk

[57] ABSTRACT

A compression ignited, spark ignited, or surface ignited engine single or multi-cylinder low temperature starting system is positioned permanently or temporarily in the intake system during the engine starting and warming-up period for an extremely cold temperature engine condition. The low temperature starting system for these engine types is capable of starting on a wide variety of liquid fuels, E.G., high or low fuel volatility, high or low fuel boiling range and gaseous fuels. A pre-heat device which is fuel fired, electrically heated, chemically heated, heated by thermal storage or other means is used to pre-heat the air or air-fuel mixture. In any one of four different configurational modes, after an initial pre-heat period, air or an air-fuel mixture is drawn through a heat exchanger with an inlet restriction that acts to increase the air residency time in the heat exchanger which increases the temperature of the inducted air that in-turn reduces the opportunity for cold air to reach the combustion chamber and yields a rich air-fuel mixture in the combustion chamber. The heated rich air-fuel mixture in the combustion chamber is further heated by compression during the compression stroke to permit combustion to occur in a sustained manner prior to and after start-up. This invention allows engine startup at extremely low ambient temperatures. Cold cranking time and energy are substantially reduced due to the rapid build-up of heat in the combustion chamber.

22 Claims, 5 Drawing Sheets

INTERNAL COMBUSTION ENGINE LOW TEMPERATURE STARTING SYSTEM

BACKGROUND OF THE INVENTION

1. Field of the Invention

This invention relates to a low temperature starting system for internal combustion engines running on middle distillate fuels and other low volatility alternative fuels, including single and multi-cylinder compression ignition, spark ignition, and surface ignition engine configurations.

The invention is applicable to internal combustion engines operating on a wide variety of liquid and gaseous fuels in vehicle applications, stationary applications, and portable applications such as generator sets. The invention allows for extremely low temperature starting of an engine with minimal expenditure of cranking energy, minimal cranking duration and speed, and minimal time between initiating the starting system and sustained engine operation.

Internal combustion engines operate by combustion processes which take place in the cylinders (combustion chambers of the engine). In spark ignition engines a combustible air/fuel mixture is drawn into the combustion chamber where a spark or ignition source is used to ignite the mixture causing expansion of the combustion gases, thereby producing power at the crankshaft. The air/fuel mixture must be inducted at a temperature sufficient to promote partial vaporization of the fuel. If the temperature of the mixture is too low, vaporization of the fuel will not be sufficient to produce a combustible mixture at the ignition source during the compression stroke, and the engine will not start.

The minimum ambient temperature at which unaided starting can occur depends on the type of fuel used. Low volatility fuels such as JP5, JP8, and diesel fuels will not allow spark ignition engine starting even at room temperature without low temperature starting aids.

In compression ignition engines air is drawn into the combustion chamber where it is compressed. Compression causes the temperature of the air to increase. When the fuel is injected into the combustion chamber, it mixes with the hot air and spontaneously combusts if a sufficient quantity of air-fuel mixture in the combustion chamber is above the auto-ignition temperature of the fuel. Auto-ignition causes the combustion gases to expand and power is produced at the crankshaft. The auto-ignition temperature of conventional compression ignition fuels is typically quite high, for example diesel fuel has an auto-ignition temperature range between 700°–900° F. The maximum combustion chamber temperature prior to sustained combustion is dependent on the compression ratio of the engine. If the mixture temperature in the combustion chamber does not reach the auto-ignition temperature, the injected (atomized) fuel will not ignite and the engine will not start. Auto-ignition is discussed in detail in Internal Combustion Engines and Air Pollution by Edward F Obert (Intext Educational Publishers).

At low ambient temperatures, the air-fuel mixture in the combustion chamber does not reach the auto-ignition temperature upon compression due to the low temperature of the inducted air and the high rate of heat loss to the engine components during compression. If the rate of heat build-up in the combustion chamber does not exceed the rate of heat transfer out of the combustion chamber, the engine will not start.

2. Description of the Prior Art

Ancillary fuels, such as ether, have been used as an aid in starting internal combustion engines at low ambient temperatures. U.S. Pat. No. 4,938,180 employs a controlled ether injection system to allow low temperature starting. The high volatility and rapid preparation rate of ether during the compression stroke creates a combustible mixture at low temperatures which aids in starting spark ignition engines. The low auto-ignition temperature of the air/ether mixture aids in starting compression ignition engines.

However, there are many drawbacks to using ether as a starting aid. Its low auto-ignition temperature causes premature combustion and undesirably high rates of combustion pressure rise (knock) in compression ignition engines, and may also cause overspeeding of the engine upon startup since compression ignition engines usually do not have any means of controlling the rate at which the air/ether mixture is inducted.

The high volatility, anesthetic properties, and low auto-ignition temperature of ether also present a safety hazard with regard to storage and use. In addition, ether tends to dry the cylinder walls of the engine resulting in excessive engine wear.

Numerous other methods have been employed to improve low temperature starting capabilities. Many of these have involved preheating major engine components such as the engine block, cylinder head, etc. These methods require very large expenditures of energy due to the large mass of metal that is heated. Some compression ignition engines have electrically powered glowplugs in pre-combustion chambers, which permits the retention of a bulk temperature sufficient to ignite the injected fuel at low ambient temperatures. Glowplugs are not normally used in open chamber compression ignition engines since the area of the exhaust valves must be reduced below the optimal size to allow space for the glowplug. Substantial electrical power is required to operate a glowplug and the minimum ambient temperature at which the engine will start depends on the engine design. A further drawback is that as the temperature decreases the cranking time increases. Engine cranking, especially at low temperatures causes excessive engine wear since the engine components do not receive optimal lubrication at such low cranking speeds. Fuel ends up on the cylinder walls diluting resident lubricating oil, which dilutes the oil in the crankcase.

Other starting methods involve preheating the inducted air or air/fuel mixture to improve starting. U.S. Pat. No. 4,682,576 assigned to Mazda Motor Corporation, Hiroshima, Japan employs electric heating elements placed in the induction system of a compression ignition engine to heat the air in conjunction with a valve system which causes high intake velocities during cranking to create compressed air in the cylinder through-inertia. Electric heating elements in the inducted air stream typically require substantial energy input for a moderate increase in air temperature at cranking speeds.

In some instances, a flame source has been installed into the induction system whereby some inducted air is heated and some inducted air is used to support flame combustion. This method is limited in that increasing the inducted air temperature requires increasing the combustion heat supplied by the flame and in so doing the oxygen content of the air is depleted, impeding the tendency for combustion of the fuel in the combustion chamber.

An object of the invention is to allow compression ignition engines and low volatility fueled spark ignition engines to start at extremely low ambient temperatures with minimal cranking time (reduced engine wear) and minimal energy expenditure without using ancillary fuels. It is assumed that at low temperatures the fuels would have appropriate pour and cloud points.

Another object is to reduce exhaust emissions and white smoke during the start-up and warm-up periods at low ambient temperatures by improving the combustion processes during the start-up and warm-up period.

SUMMARY OF THE INVENTION

Accordingly the invention provides a cold starting system for internal combustion engines operating on middle distillate fuels and other low volatility alternative fuels, comprising an air intake duct for supplying intake air to the engine during start-up and normal operating conditions; throttle means for restricting air flow to said engine during start-up so as to prevent the engine from taking in excess cooled or partially heated air; and auxiliary heating means operating independently of said engine for pre-heating said intake air at a flow rate limited by said throttle means to a temperature sufficient to ensure sustainable combustion without undue ignition delay during a normal engine cycle prior to attainment of normal engine operating conditions.

The expression "undue delay" means undue ignition delay that leads to excessive rates of combustion pressure increase, which must be avoided.

In a preferred embodiment of the invention a metered quantity of fuel is added to the intake air prior to preheating, and the engine is started in a fuel-metered mode. After ignition and an appropriate warm-up period, the engine is switched over to the diesel fuel injection mode.

The invention involves two main components, namely the induction system heat exchanger and the heating source for the heat exchanger, which are added to the internal combustion engine to allow low temperature starting. The heat exchanger in conjunction with an airflow restriction device is used to allow highly efficient heating of the inducted air or air/fuel mixture during cranking of the engine, such that auto-ignition temperatures are reached in compression ignition engines and combustible air/fuel mixtures are generated in spark ignition engines, thereby allowing the engines to start more rapidly with less cranking energy, less cranking speed and at extremely low temperatures.

The heat exchanger is heated by a heating source which may be a fuel fired burner (wick or wickless), an electrical heating device, a chemical heating device, thermal storage device, or other means.

Tests have shown that the invention will allow engine starting (hand starting of small internal combustion engines, battery starting of large engines) down to extremely low ambient temperatures (−50.0° C.) within a few revolutions of the crankshaft at low cranking speeds. During warm-up the heating source is left on to continue heating the intake air or air-fuel mixture such that combustion is improved and emissions and white smoke are reduced. The heating source is turned off by a manual or thermoelectric switch as the engine approaches operating temperature. At very low temperatures white smoke may re-occur when the heating source is shut off; in this case auxiliary heat is supplied to the intake air or air-fuel mixture through a heat exchanger which is heated by the engine exhaust manifold.

The heat exchanger is used to efficiently transfer heat from a heating source to the inducted air or air/fuel mixture during engine cranking. The efficiency of the heat exchanger is improved by limiting the mass flow of air or air-fuel mixture through it with the throttle means. In the case of a carburetted spark-ignition or surface-ignition engine, the carburetor choke valve may be placed in the closed or semi-closed position to limit the airflow into the engine and thus limit the mass flow of air through the heat exchanger.

In the case of a compression ignition (diesel) engine, the mass flow of air through the heat exchanger may be limited by placing a restrictive device such as an orifice or valve in the induction airstream and/or by restricting the air flow path inside the heat exchanger. Restricting the airflow increases the residence time of the air or air/fuel mixture in the heat exchanger so as to heat the air or air/fuel mixture to a higher temperature.

The heat exchanger may be placed in-line with the main induction system. If a carburetor or air/fuel mixing device is used in the induction system the heat exchanger is placed between the carburetor or fuel metering device and the combustion chamber of the engine. If an air/fuel mixing device is not present in the induction system, the heat exchanger is placed in the intake air induction system between the air filter and the combustion chamber.

The heat exchanger may also be placed off to the side of the main induction system as an auxiliary system whereby all of the air or air/fuel mixture entering the engine during starting is diverted through the heat exchanger by means of a diverter mechanism in the main induction system. After the engine has started the diverter mechanism is positioned such that the air or air/fuel mixture is allowed to flow into the engine through the main induction system thereby allowing normal engine operation.

The induction air heat exchanger may be heated by a variety of heating sources. The type of heating source depends on the application. Fuel fired burners (wick and wickless types), electrical energy, chemical energy, thermal storage devices or other means may be used to provide heat to the induction air heat exchanger. Fuel fired burners require minimal electrical energy supply (small batteries e.g. two D-cells) to cause initial ignition of the fuel. Combustion of fuel in the burner is used to provide the necessary heat.

The invention also provides a method of cold starting an internal combustion engine operating on middle distillate fuels and other low volatility alternative fuels, comprising the steps of supplying a restricted flow of intake air to the engine; and heating the intake air during cold starting to a temperature sufficient to ensure sustainable combustion without undue ignition delay during an engine cycle prior to attainment of normal engine operating conditions.

There are thus four basic configurations of the invention depending on the type of internal combustion engine to which it is applied.

In an auxiliary heat exchanger system, where only intake air is heated, the heat exchanger is placed off to the side of the main induction system as an auxiliary system such that all of the inducted air (only air) during starting and warm-up passes through the heat exchanger. As the engine warms up a thermoelectric or manual device opens a diverter valve which allows the inducted air to pass through the main induction system. In this way the heat exchanger can be made small since the air passes unrestricted through the main induction system when the engine is warmed up.

In an auxiliary heat exchanger system, where an air-fuel mixture is heated, the heat exchanger in conjunction with an auxiliary carburetor or other air/fuel mixing device is placed off to the side of the main induction system as an auxiliary system, such that all of the inducted air/fuel mixture during starting and warm-up passes through the heat exchanger. As the engine warms up a thermoelectric or manual device opens a diverter valve which allows the engine to operate on inducted air or air/fuel mixture passing through the main induction system. In this way the heat exchanger can be made small since the air or air-fuel mixture passes unrestricted through the main induction system when the engine is warmed up.

In a main induction system heat exchanger, where only intake air is heated, the heat exchanger is positioned in the main induction system such that all the intake air is heated. During normal engine operation at load all of the inducted air must pass through the heat exchanger regardless of whether heat is being applied to the heat exchanger or not. As a result, the heat exchanger must be quite large such that it does not unduly impede the airflow and thereby reduce engine power. This heat exchanger configuration will require a higher pre-heat temperature than the auxiliary heat exchanger system.

In a main induction system heat exchanger, where an air-fuel mixture is heated, the heat exchanger is positioned in the main induction system between the combustion chamber and the carburetor or other air/fuel mixing device and heats the air/fuel mixture as it is inducted into the engine. During normal engine operation at load all of the inducted air-fuel mixture must pass through the heat exchanger regardless of whether heat is being applied to the heat exchanger or not. As a result the heat exchanger must be quite large such that it does not unduly impede the airflow and thereby reduce engine power. This heat exchanger configuration will also require a higher pre-heat temperature than the auxiliary heat exchanger system.

As previously noted the heat exchanger requires a means of restricting the inducted air or air/fuel mixture passing through it during starting and warm-up. The restriction device limits the mass flow of air or air-fuel mixture through the heat exchanger such that heat is more effectively transferred to the air or air/fuel mixture.

Limiting the quantity of air or air/fuel mixture inducted through the heat exchanger reduces the chance that low temperature ambient air or air/fuel mixture may enter the combustion chamber without being preheated. It was determined that when a small quantity of very high temperature air or air fuel mixture was inducted into the combustion chamber of an engine, starting/cranking times were reduced and starting occurred at lower ambient temperatures than when a greater amount of moderately high temperature air was inducted into the combustion chamber.

The restriction device also effectively enrichens the combustion mixture whether applied to a spark ignition or compression ignition engine by reducing the amount of airflow to the combustion chamber without reducing the fuel flow. Enrichening the air/fuel mixture or decreasing the induction airflow without decreasing the amount of fuel metered per engine revolution statistically increases the probability that a sufficient number of fuel molecules will be properly prepared in the combustion chamber in time to support and sustain combustion.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
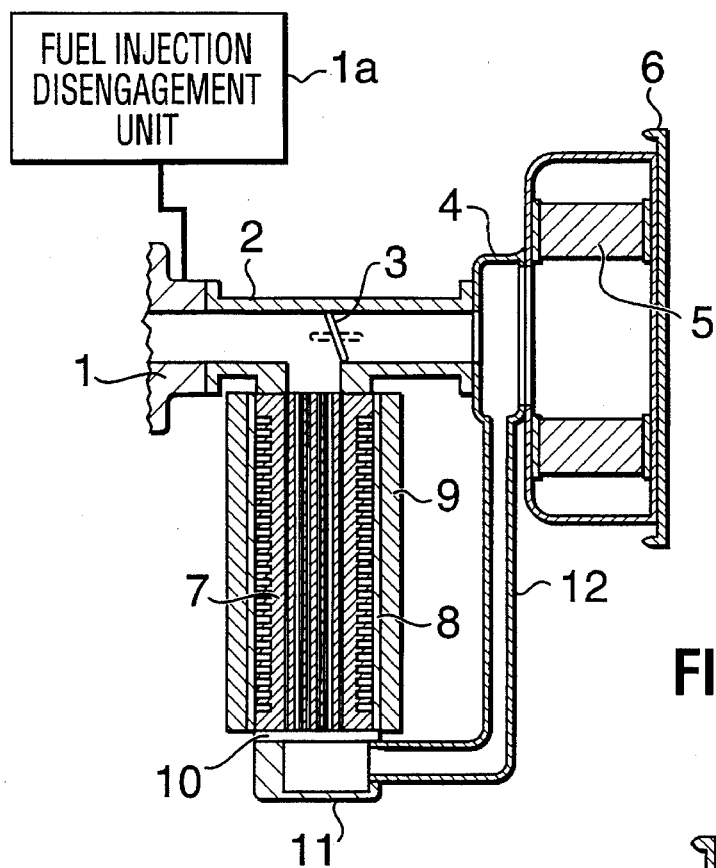
FIG. 1 is a horizontal sectional view of the engine and heat exchanger components.
Figure 2:
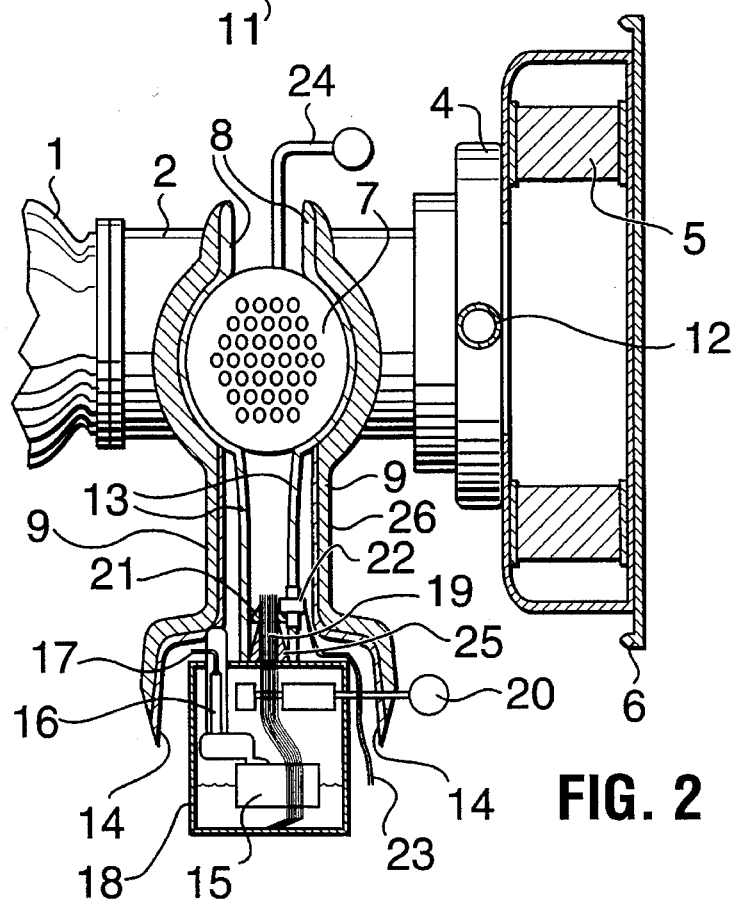
FIG. 2 is a vertical sectional view of the heating source (diesel fuel fired wick type burner)
Figure 3:
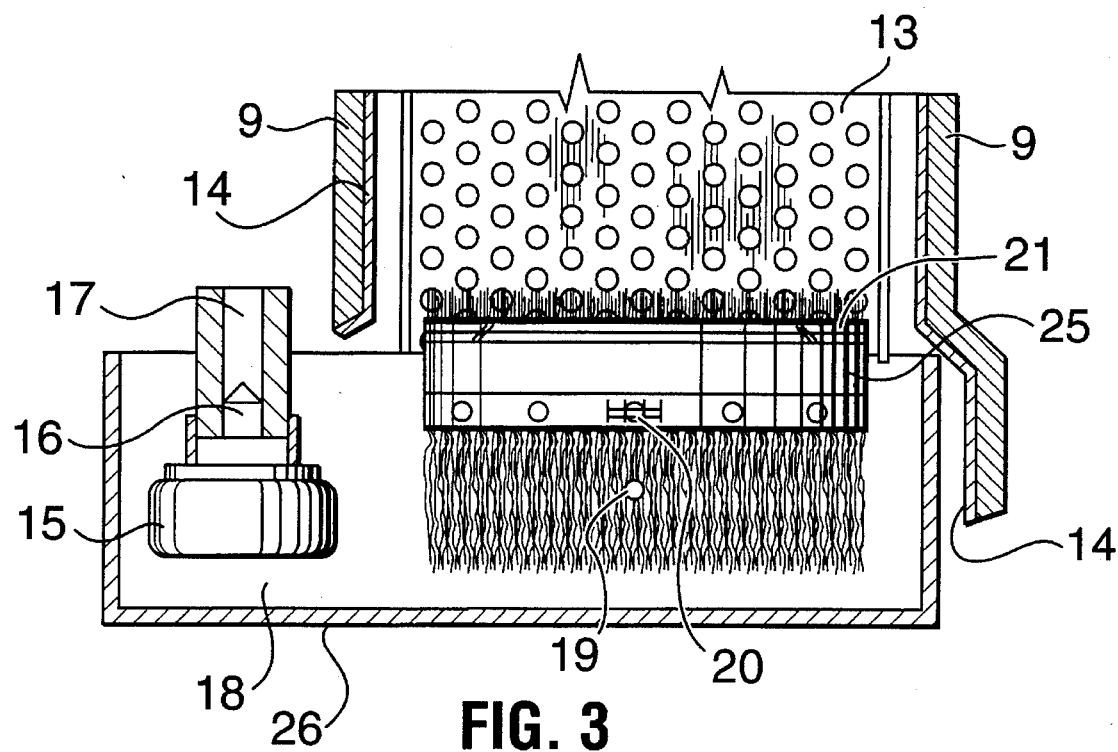
FIG. 3 is a side view of the bottom portion of the heater.

Referring now to FIGS. 1 to 3, the cold-starting system for a fuel injection compression ignition engine comprises cylinder head (intake valve area) 1, main induction system 2, diverter valve 3, air filter casing 4, air filter element 5, air filter casing cover 6, heat exchanger 7, heat source shroud 8, insulation 9, and diffuser screen 10. Air supply cap 11 fits onto heat exchanger 7 and is connected through air supply tube 12 to air filter casing 4.

The cold starting system includes a fuel injection disengagement unit 1a to permit the fuel injection system for the engine to be disengaged during a start-up mode when the cold-starting system is active.

The heater comprises perforated combustion plates 13, wind baffle plates 14, fuel level control float 15, needle valve and seat 16, fuel inlet tube 17, fuel tank 18, and fuel wick 19, wick advance-retraction lever 20, flame extinguishing flaps 21, spring-loaded ignition device 22, ignition power leads 23, diverter valve lever 24, wick guide 25, and heat source (fuel fired burner) 26.

This configuration of the low temperature starting system was used to allow hand starting of a compression ignition, single cylinder, naturally aspirated, four-stroke direct injection diesel engine (2 kW generator set) operating on arctic diesel fuel and synthetic lubricants at −50.0° C. The lowest ambient temperature at which the engine could be manually started without using a starting aid was −5.0° C.

Upon initiating the low temperature starting system, diverter valve 3 is positioned (as shown by the solid outline) by the diverter valve lever 24 such that no air may flow through the main induction system 2 without first passing through the heat exchanger 7. Next the heat exchanger 7 heating source 26 is turned on by first raising the arctic diesel fuel soaked wick 19 through the wick guide 25 via adjusting the wick advance-retraction lever 20.

The ignition device 22 is then engaged such that electric energy from two D cell batteries (not shown) passes through the ignition power leads 23 to the ignition device 22. Electrical energy is converted into heat by the ignition device 22 which ignites the arctic diesel fuel soaked wick 19. In an emergency situation, such as battery failure, the fuel soaked wick 19 can be ignited by a match, lighter or other heat source. Blue flame combustion of the arctic diesel fuel occurs between the perforated combustion plates 13, causing the hot combustion products to rise and pass between the heat exchanger 7 and the insulated heat source shroud 8. This results in external heating of the finned heat exchanger.

The insulation of the heat source shroud 8 may be on the outside of the heat source shroud 8 as shown in FIG. 2 or on the inside of the heat source shroud 8. A fuel tank 18, fuel level control float 15, and needle valve and seat 16 are used to control the fuel level in the heating source 26 such that the wick 19 is properly saturated with fuel. Wind baffle plates 14 are used to prevent wind currents from affecting the combustion flame.

Upon cranking to start the engine, ambient air is ducted through the air filter casing 4, into the air filter element 5, then through the air supply tube 12 and air supply cap 11. The air then passes through a diffuser screen 10 which restricts the flow such that the heat exchanger 7 can effectively raise the air temperature to a value near the temperature of the heat exchanger 7 without allowing any low temperature or partially heated air to enter the engine combustion chamber.

The heated air enters the main induction system 2 and then proceeds into the cylinder head 1 where it is compressed inside the engine and thus further heated such that auto-ignition temperatures are reached and sustained combustion can occur. Combustion causes expansion of the gases in the engine thereby producing the necessary power to start the engine.

After startup the engine is allowed to warm up for a few minutes at which time the diverter valve 3 is opened manually or by a thermoelectric switch to a position indicated by the dotted outline such that the air entering the engine is not restricted, thereby allowing the engine to produce maximum output power. Next the heat source 26 is shut off by adjusting the wick advance-retraction lever 20 to retract the wick 19 and by deploying the spring loaded flame extinguishing flaps 21 to extinguish the flame.

Testing at −50.0° C. ambient temperatures with arctic diesel fuel required 4 minutes of preheating applied to the heat exchanger 7 by the heat source 26 at which time the generator set engine was hand started with one pull on the recoil starting mechanism. The engine was allowed to warm up before shutting off the heating source 26 and only a minimal amount of white smoke was observed during start up. The diverter valve 3 was opened after warm-up to allow air to be inducted through the main induction system 2 to allow unrestricted airflow into the engine for operation under load. Exhaust heat from a heat exchanger on the exterior of the exhaust manifold (not shown) was then used to heat the inducted air to allow efficient engine operation with minimal exhaust emissions and without white smoke.

It should be noted that configuration no. 3 (Main Induction System Heat Exchanger, Heating of Air Only) provided similar test results to those outlined above in configuration no. 1. The engine started at −50.0° C. on arctic diesel fuel with approximately 4 minutes of heat exchanger preheating.

Figure 4:
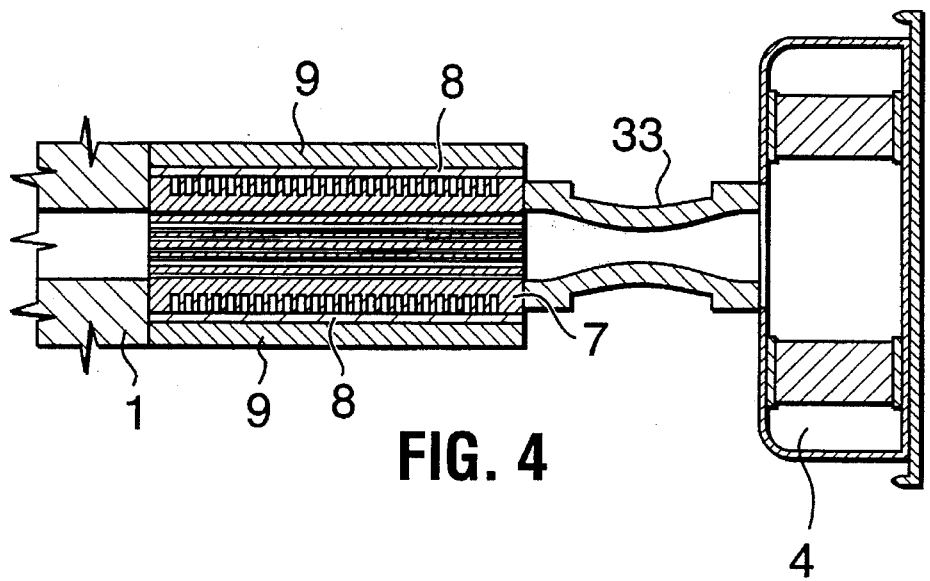
FIG. 4 is a horizontal sectional view of the engine and heat exchanger components in a second embodiment of the invention.
Figure 5:
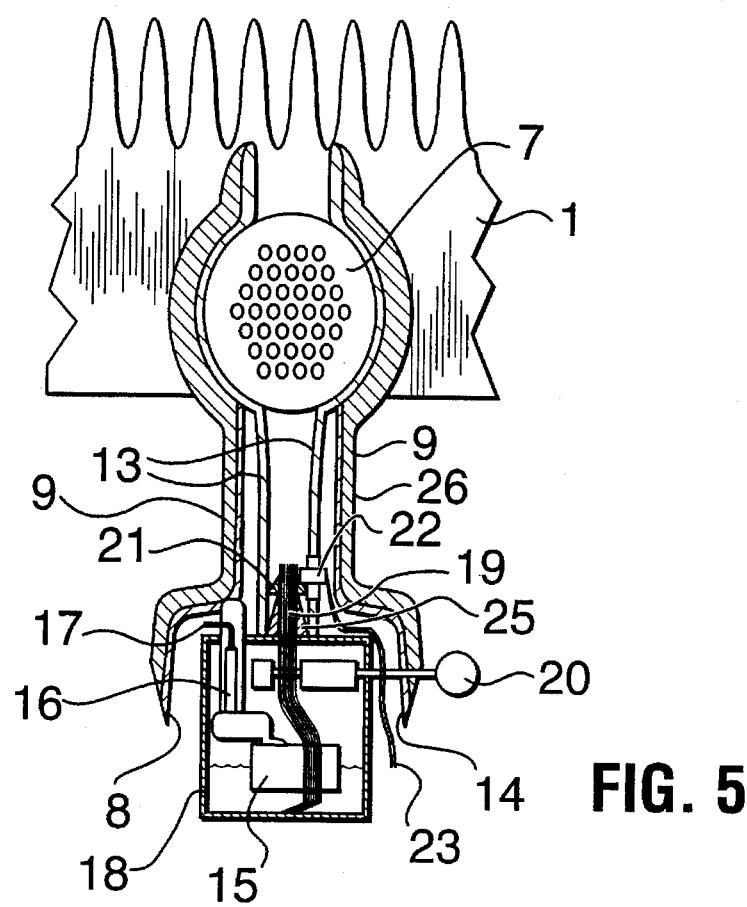
FIG. 5 a vertical sectional view the engine and heat exchanger of the second embodiment.
Figure 6:
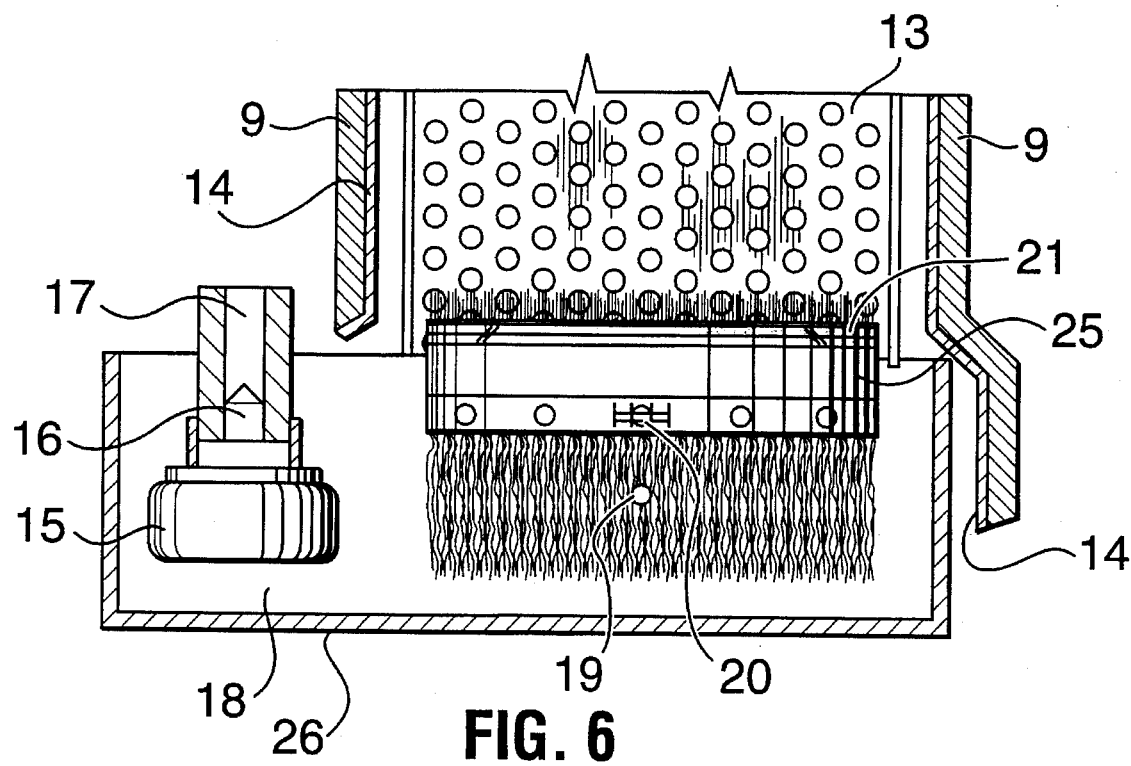
FIG. 6 a side view of the bottom portion of the heater.

Referring now to FIGS. 4 to 6, like parts have like reference numerals. This configuration of the low temperature starting system, which includes a carburetor 33, was designed to allow a spark ignition engine to start and operate on JP5, JP8 and similar middle distillate fuels. The test engine was a small generator set engine originally designed to operate on gasoline that could not be started on either JP5 or JP8 fuels at room temperature without the application of a starting aid. The low temperature starting system as described by configuration no. 4 allowed the engine to be started on both fuels at −38.0° C. Lower ambient starting temperatures are probable but have not been attempted to date.

Upon initiating the low temperature starting system, the carburetor choke valve is closed to restrict the airflow into the heat exchanger. Next the heat source 26 of heat exchanger 7 is turned on by first raising the fuel-soaked wick 19 through the wick guide 25 by adjusting the wick advance-retraction lever 20. The ignition device 22 is then engaged such that electric energy from two D cell batteries (not shown) passes through the ignition power leads 23 to the ignition device 22. Electrical energy is converted into heat by the ignition device 22 which ignites the fuel soaked wick 19.

In an emergency situation, such as battery failure, the fuel soaked wick 19 can be ignited by a match, lighter or other heat source. Blue flame combustion of the fuel occurs between the perforated combustion plates 13, causing the hot combustion products to rise and pass between the heat exchanger 7 and the insulated heat source shroud 8.

This results in external heating of the finned heat exchanger. A fuel tank 18, fuel level control float 15, and needle valve and seat 16 are used to control the fuel level in the heating source such that the wick 19 is properly saturated with fuel. Wind baffle plates 26 are used to prevent wind currents from affecting the combustion flame.

Referring again to FIG. 1, upon cranking to start the engine, ambient air passes through the air filter casing assembly 4 then through the carburetor 3 (carburetor choke valve placed in the closed position). As the air passes through the carburetor 3, fuel is drawn into the airstream by the vacuum generated in the carburetor 3 from the choking effect.

The air/fuel mixture then enters the heat exchanger 7 at low pressure due to the carburetor 3 choke used to restrict the air flow. The mixture is heated by the heat exchanger 7 such that the fuel vaporizes forming an easily ignited combustible mixture which enters the combustion chamber through the cylinder head intake port 1. The combustible air/fuel mixture is then ignited by the spark ignition device spark plug in the combustion chamber causing the combustion gases to expand and produce the necessary power to start the engine.

After startup, the engine is allowed to warm up for a few minutes at which time the carburetor 3 choke valve is opened such that the air entering the engine is not restricted, thereby allowing the engine to produce maximum output power. Next the heat source 19 is shut off by adjusting the wick advance-retraction lever 14 to retract the wick 13 and by deploying the spring loaded flame extinguishing flaps 15 to extinguish the flame.

Testing at −38.0° C. ambient temperatures required 4 minutes of preheating applied to the heat exchanger 2 by the heat source 19, at which time the generator set engine was hand started with one pull on the recoil starting mechanism using JP5 and JP8 fuels.

It was determined that the starting and operating characteristics of engines which require the heat exchanger to heat an air/fuel mixture could be improved by modifying the inside of the heat exchanger to incorporate V-shaped or square shaped circumferential internal grooves. At −38.0° C. the test engine started and operated significantly better with the addition of the internal grooves to the inside of the heat exchanger.

The engine was allowed to warm up before shutting off the heating source 19 and only a minimal amount of white smoke was observed during start up. The carburetor 3 choke valve was opened after warm-up to allow air to be inducted without restricting the airflow into the engine for operation under load. Due to operational instability difficulties and excessive white smoke, exhaust heat from a heat exchanger on the exterior of the exhaust manifold (not shown) was then used to heat the inducted air to allow efficient engine operation with minimal exhaust emissions and without white smoke.

It should be noted that Configuration no. 2 (Auxiliary Induction System Heat Exchanger, Heating of Air/Fuel Mixture) provided similar test results to those outlined above in Configuration #4. The engine started at −38.0° C. on JP5 and JP8 fuels with approximately 4 minutes of heat exchanger preheating.

Figure 7:
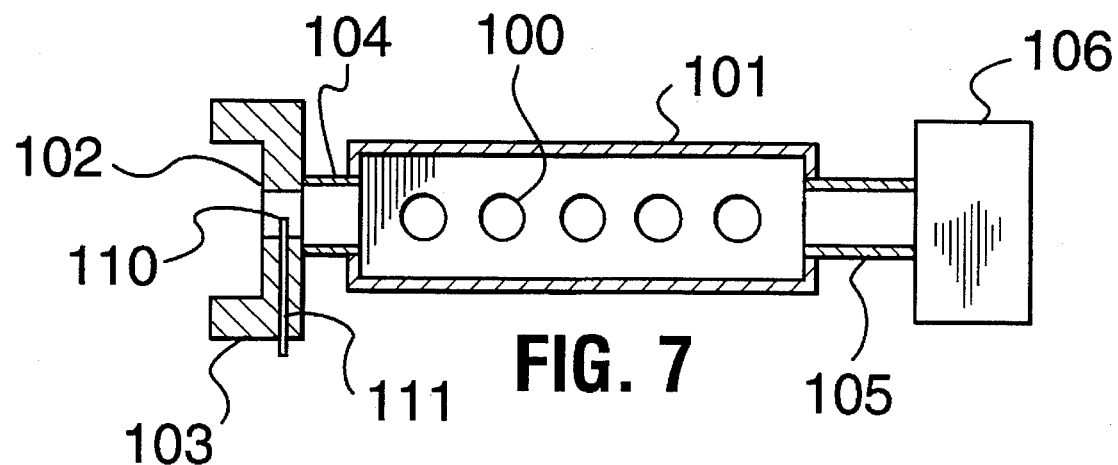
FIG. 7 is a plan view of a third embodiment of a heat exchanger.
Figure 8:
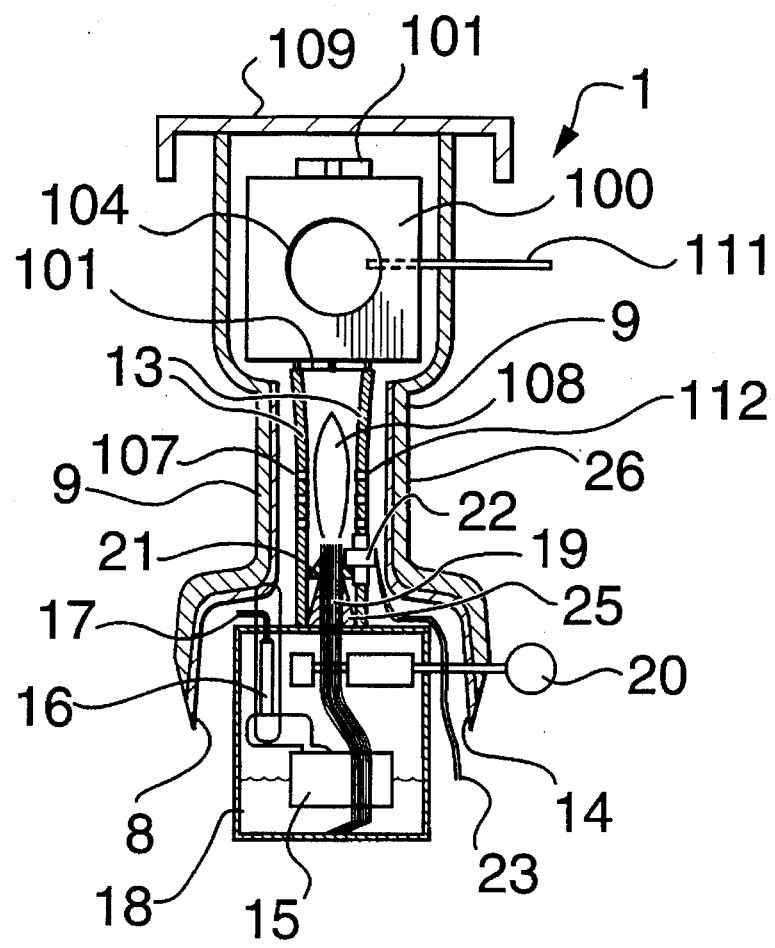
FIG. 8 is an vertical sectional view of the heat exchanger shown in FIG. 7.

Referring now to FIGS. 7 and 8, the heat exchanger comprises a brass tube 100, approximately 2.5 cms. square in cross section and 8.5 cms. long. A set of vertical flue tubes 101, which are finned on the outside, pass through the tube 100 without communicating with the interior thereof so as to carry hot air through the tube 100. Intake air flows through throttle 102 in end piece 103 and through connecting pipe 104 to the tube 100. From there, after being heated, it passes through connecting pipe 105 to intake manifold 106. The volume of air within the tube 100 is approximately 25 cc.

The burner is similar to that of the embodiment shown in FIGS. 5 and 6. The combustion plates 13 have a plurality of small holes 107. The small holes permit air to pass through to the wick 19. The result is a spreading out of the blue flame combustion 108 from the wick 19, which tends to fill the whole space between the combustion plates and increase the quantity of heat generated by the burner. Small flame jets appear at the holes 107, with the wick just providing the vaporized fuel to feed the blue flame combustion between the baffle plates 13. The hot combustion gases then pass through vertical tubes 101, exchanging heat with intake air flowing through tube 100. Cover 109 helps to prevent downdraughts through the heat exchanger vertical tubes 101.

In this embodiment, atomized fuel from reservoir 18 is metered into the throttle 102 through nozzle 110 of fuel pipe 111.

During the cold starting operation of the diesel engine, the normal diesel fuel injection system is disengaged, and the engine aspirates a hot mixture of air and atomized fuel in the manner of a carburetor. After starting, the engine is switched back to normal operation using fuel injection.

Figure 9:
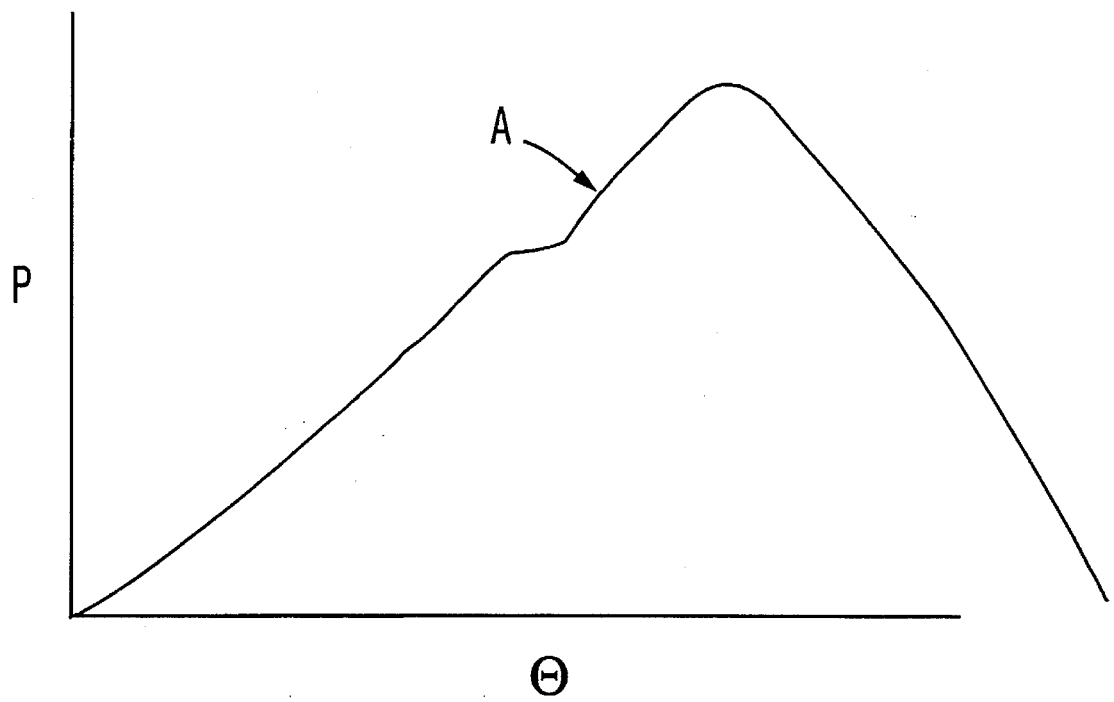
FIG. 9 is a graph showing pressure against crankshaft angle for a compression ignition engine.

FIG. 9 shows the auto-ignition point A for a compression ignition engine under normal operating conditions and will be recognized by one skilled in the art. The object of the arrangement described is to heat the intake air to a temperature sufficient to achieve auto-ignition upon cold starting and to ensure sustainable combustion without undue ignition delay prior to attainment of normal operating conditions. When fuel is added to the air in the throttle 102, with the arrangement described, the air in the heat exchanger 100 should be heated to about 290° F. (determined by measuring the temperature of the brass wall of tube 100). The throttle 102 is 0.25 inches in diameter, and the size of nozzle 110 is 0.0135 inches (#80 drill size).

With fuel metered into the throttle 102, a homogeneous hot air charge is metered into the engine. This ensures that the whole charge ignites at the compression ignition temperature in contrast to the conditions that prevail when a fuel charge is injected directly into the combustion chamber. In the latter case, the fuel ignites first just at the periphery of the spray.

Under certain conditions, the fuel pipe 111 can be dispensed with if the intake air is heated to a much higher temperature, in the order of 700°–800° F. In this case, the normal diesel fuel injection system is turned on.

Engine knock is another factor that has to be considered. It has been found that knock can be controlled by not letting the air temperature get too high, since this is conducive to premature ignition.

For mechanically blown, super-charged engines, an air bleed may be provided from the high pressure side of the blower to the air intake of the system.

The invention thus provides a practical cold starting system for compression ignition engines. It can also be used to reduce the cranking requirements at higher temperatures and thus permit the use of lighter duty cranking motors and batteries in compression ignition engines.

We claim:

1. A cold starting system for a fuel-injected, compression ignition or spark assisted internal combustion engine operating on middle distillate fuels and other low volatility alternative fuels, comprising:

means for switching between a start-up mode in which a fuel-injection system for said internal combustion engine is inactive and a normal mode in which the fuel-injection system is active;

an air intake duct for supplying intake air to the engine during normal operating conditions;

throttle means for restricting air flow to said engine through said air intake duct during start-up so as to prevent the engine from taking in excess cooled or partially heated air;

means for mixing fuel with said intake air in the intake duct in said start-up mode so that an air-fuel mixture is supplied to the engine; and auxiliary heating means operating independently of said engine for pre-heating said air-fuel mixture in said start-up mode at a flow rate limited by said throttle means to a temperature sufficient to ensure sustainable combustion without undue ignition delay during a normal engine cycle prior to attainment of normal engine operating conditions;

whereby said engine can be started on said pre-heated air-fuel mixture supplied through said intake duct and then switched to fuel injection when normal operating conditions have been attained.

2. A cold starting system as claimed in claim 1, wherein said mixing means includes metering means for mixing a measured quantity of fuel into said intake air.

3. A cold starting system as claimed in claim 2, wherein said mixing means comprise a carburetor operational during start-up.

4. A cold starting system as claimed in claim 1, wherein said auxiliary heating means includes a heat exchanger for transferring heat from an auxiliary heat source to said intake air.

5. A cold starting system as claimed in claim 4, wherein said air duct comprises a main air duct and an auxiliary air duct, and said heat exchanger is located in said auxiliary air duct to the side of said main air duct, and a diverter valve is provided to divert the intake air into said heat exchanger during start-up conditions.

6. A cold starting system as claimed in claim 4, wherein said heat exchanger is located in-line with said air duct, and said throttle means comprises a restriction in said air duct.

7. A cold starting system as claimed in claim 4, wherein said auxiliary heating means further includes a burner for supplying heat to said heat exchanger.

8. A cold starting system as claimed in claim 7, wherein said burner is a wick-type burner.

9. A cold starting system as claimed in claim 8, wherein said wick-type burner derives its fuel supply from the same supply as the engine.

10. A cold starting system as claimed in claim 8, further comprising an electrically operated ignition device for igniting said wick prior to engine start-up.

11. A cold starting system as claimed in claim 8, wherein the wick of said wick-type burner is located so as to direct the flame between a pair of perforated baffle plates leading to said heat exchanger in order to provide blue flame combustion.

12. A cold starting system as claimed in claim 8 further comprising a fuel reservoir for said wick burner, a control float, and a valve operated by said control float to maintain liquid fuel in said reservoir at a desired level.

13. A cold starting system as claimed in claim 1, comprising a heat exchanger tube through which the intake air flows to be pre-heated, said throttle means being located at the inlet of said heat exchanger tube, and means for dispensing a controlled quantity of fuel into said intake air so that a mixture of fuel and air is heated in said heat exchanger.

14. A cold starting system as claimed in claim 13, wherein said fuel dispensing means dispenses an emulsion of fuel and air.

15. A cold starting system as claimed in claim 13, wherein said fuel dispensing means is an injection nozzle.

16. A cold starting system as claimed in claim 13, further comprising a plurality of flue tubes extending transversely through said heat exchanger tube, the interior of said flue tubes not being in communication with the interior of said heat exchanger tube.

17. A cold starting system as claimed in claim 16, wherein said auxiliary heating means comprises a wick-type burner, and combustion gases from said wick burner escape through the interior of said flue tubes.

18. A cold starting system as claimed in claim 16, wherein said wick-type burner is confined between perforated baffle plates containing a plurality of holes to permit the entry of air to spread out the blue flame combustion, thereby improving the quantity of heat generated by the burner.

19. A method of cold starting a fuel-injected, compression ignition or spark-assisted internal combustion engine operating on middle distillate fuels and other low volatility alternative fuels, comprising the steps of supplying a restricted flow of intake air to the engine; mixing fuel with the intake air; heating the mixture of fuel and intake air in a start-up mode to a temperature sufficient to ensure sustainable combustion without undue ignition delay during an engine cycle prior to attainment of normal engine operating conditions; starting the engine on said pre-heated mixture of fuel and intake air with fuel injection inactive; and switching over to normal fuel injection upon attainment of normal operating conditions.

20. A method as claimed in claim 19, wherein a metered quantity of fuel is mixed with said intake air during cold start-up.

21. A method as claimed in claim 20, wherein said fuel is supplied by a carburetor operational during start-up conditions.

22. A method as claimed in claim 19, wherein said intake air is heated with a heat exchanger and a wick-type burner supplied with fuel from the same fuel supply as the engine.

\* \* \* \* \*